(12) United States Patent
Rieken et al.

(10) Patent No.: US 7,512,951 B2
(45) Date of Patent: Mar. 31, 2009

(54) METHOD AND APPARATUS FOR TIME-SLICED AND MULTI-THREADED DATA PROCESSING IN A COMMUNICATION SYSTEM

(75) Inventors: Keith Rieken, Cupertino, CA (US); Joel D. Medlock, Los Gatos, CA (US); David M. Holmes, Cupertino, CA (US)

(73) Assignee: Infineon Technologies AG, Neubiberg (DE)

( * ) Notice: Subject to any disclaimer, the term of this patent is extended or adjusted under 35 U.S.C. 154(b) by 1203 days.

(21) Appl. No.: 09/920,093

(22) Filed: Jul. 31, 2001

(65) Prior Publication Data

US 2002/0018515 A1 Feb. 14, 2002

Related U.S. Application Data

(60) Provisional application No. 60/222,007, filed on Jul. 31, 2000.

(51) Int. Cl.
*G06F 9/46* (2006.01)
*G06F 15/76* (2006.01)
*G06F 13/00* (2006.01)
*G06F 3/00* (2006.01)

(52) U.S. Cl. ............... 718/107; 718/100; 718/102; 712/1; 711/100; 711/129; 710/1

(58) Field of Classification Search ......... 718/100–104, 718/107; 712/1; 711/100, 129, 3, 118; 710/1
See application file for complete search history.

(56) References Cited

U.S. PATENT DOCUMENTS

| | | | | |
|---|---|---|---|---|
| 5,287,508 A | * | 2/1994 | Hejna et al. | 718/102 |
| 5,640,398 A | * | 6/1997 | Carr et al. | 370/376 |
| 5,654,979 A | * | 8/1997 | Levin et al. | 375/142 |
| 5,878,228 A | * | 3/1999 | Miller et al. | 709/235 |
| 5,920,607 A | * | 7/1999 | Berg | 379/1.01 |
| 5,943,363 A | * | 8/1999 | Hanson et al. | 375/150 |
| 6,005,856 A | | 12/1999 | Jensen et al. | |
| 6,009,452 A | * | 12/1999 | Horvitz | 718/102 |

(Continued)

FOREIGN PATENT DOCUMENTS

WO    WO-00/69084 A1    11/2000

(Continued)

OTHER PUBLICATIONS

Rabaey, Jan M. et al.; "Heterogeneous Reconfigurable Systems"; Signal Processing Systems, 1997, SIPS 97—Design and Implementation, 1997 IEEE Workshop in Leicester, UK, Nov. 3-5, 1997, pp. 24-34.

(Continued)

*Primary Examiner*—Meng-Ai An
*Assistant Examiner*—Abdullah Al Kawsar
(74) *Attorney, Agent, or Firm*—Dickstein Shapiro LLP

(57) ABSTRACT

A method for designing a time-sliced and multi-threaded architecture comprises the steps of conducting a thorough analysis of a range of applications and building a specific processor to accommodate the range of applications. In one embodiment, the thorough analysis includes extracting real time aspects from each application, determining optimal granularity in the architecture based on the real time aspects of each application, and adjusting the optimal granularity based on acceptable context switching overhead.

30 Claims, 2 Drawing Sheets

U.S. PATENT DOCUMENTS

| | | | |
|---|---|---|---|
| 6,091,762 A | 7/2000 | Davis et al. | |
| 6,105,119 A * | 8/2000 | Kerr et al. | 711/219 |
| 6,349,363 B2 * | 2/2002 | Cai et al. | 711/129 |
| 6,363,458 B1 * | 3/2002 | Park | 711/141 |
| 6,493,658 B1 * | 12/2002 | Koford et al. | 703/1 |
| 6,591,355 B2 * | 7/2003 | Schuster et al. | 711/202 |
| 6,621,857 B1 * | 9/2003 | Belotserkovsky et al. | 375/149 |
| 6,725,336 B2 * | 4/2004 | Cherabuddi | 711/129 |
| 6,731,622 B1 * | 5/2004 | Frank et al. | 370/342 |
| 6,934,319 B2 * | 8/2005 | Subramanian | 375/142 |
| 2002/0001305 A1 * | 1/2002 | Hughes et al. | 370/369 |
| 2004/0213333 A1 * | 10/2004 | Huang et al. | 375/150 |

FOREIGN PATENT DOCUMENTS

WO      WO-00/69192 A1    11/2000

OTHER PUBLICATIONS

Abnous, Arthur et al.; "Ultra-Low-Power Domain-Specific Multimedia Processors"; VLSI Signal Processing, IX, 1996, Workshop in San Francisco, CA, USA, Oct. 30-Nov. 1, 1996, pp. 461-470.

Rabaey, Jan M.; "Reconfigurable Processing: The Solution to Low-Power Programmable DSP"; Acoustics, Speech, and Signal Processing, 1997. ICASSP-97, 1997 IEEE International Conference in Munich, Germany, Apr. 21-24, 1997, pp. 275-278.

Tuttlebee, Walter Dr.; "Software Radio—Impacts and Implications"; Spread Spectrum Techniques and Applications, 1998. Proceedings, 1998 IEEE 5th International Symposium in Sun City, South Africa Sep. 2-4, 1998, vol. 2, pp. 541-545.

Arrigo, Jeanette, F. et al.; "Adaptive FEC on a Reconfigurable Processor for Wireless Multimedia Communications"; Circuits and Systems, 1998. ISCAS '98. Proceedings of the 1998 IEEE International Symposium in Monterey, CA, USA May 31-Jun. 3, 1998, vol. 4, pp. 417-420.

Halter, Steve et al.; "Reconfigurable Signal Processor for Channel Coding & Decoding in Low SNR Wireless Communications"; Signal Processing Systems, 1998. SIPS 98. 1998 IEEE Workshop in Cambridge, MA, USA Oct. 8-10, 1998, pp. 260-274.

* cited by examiner

METHOD AND APPARATUS FOR TIME-SLICED AND MULTI-THREADED DATA PROCESSING IN A COMMUNICATION SYSTEM

PRIORITY INFORMATION

This application claims priority from the Provisional Application entitled "Apparatus and Method for Despreading Data in a CDMA System", U.S. Ser. No. 60/222,007, filed on Jul. 31, 2000.

CROSS REFERENCE TO RELATED APPLICATION

Related applications are:

"Generic Finger Architecture for Spread Spectrum Applications", filed concurrently herewith, having U.S. Ser. No. 09/920,094, and now U.S. Pat. No. 6,459,883;

"Apparatus and Methods for Sample Selection and Reuse of Rake Fingers in Spread Spectrum Systems", filed concurrently herewith, and having U.S. Ser. No. 09/920,095; and "Apparatus and Method for Configurable Multi-dwell Search Engine for Spread Spectrum Applications", filed concurrently herewith, having U.S. Ser. No. 09/919,700, and now U.S. Pat. No. 7,003,015.

Each of these applications is incorporated herein by reference.

BACKGROUND OF THE INVENTION

This invention relates generally to wireless communication systems.

Wireless communication has extensive applications in consumer and business markets. Among the many communication applications/systems are: mobile wireless, fixed wireless, unlicensed Federal Communications Commission (FCC) wireless, local area network (LAN), cordless telephony, personal base station, telemetry, and others.

Signal processing protocols and standards have proliferated with advances in wireless communications devices and services. Current communications protocols include Frequency Division Multiplexing (FDM), Time Division Multiple Access (TDMA), and Code Division Multiple Access (CDMA). The United States, Europe, Japan, and Korea have all developed their own standards for each communications protocol. TDMA standards include Interim Standard-136 (IS-136), Global System for Mobile (GSM), and General Packet Radio Service (GPRS). CDMA standards include Global Positioning System (GPS), Interim Standard-95 (IS-95) and Wide Band CDMA (WCDMA). Wireless communications services include paging, voice and data applications.

In many cases, within the same field of applications, different systems use incompatible modulation techniques and protocols. Consequently, each system may require unique hardware, software, and methodologies for baseband processing. This practice can be costly in terms of design, testing, manufacturing, and infrastructure resources. As a result, a need arises to overcome the limitations associated with the varied hardware, software, and methodology of processing digital signals in each of the varied applications.

Until recently, individual wireless communications devices supported a single communications standard. In theory, however, a wireless communications device can be designed using a general purpose Digital Signal Processor (DSP) that is programmed first to realize a first set of functional blocks specifying the minimum performance requirements for a first application and can be reprogrammed to realize a second set of functional blocks to provide a second application. To achieve these minimum performance requirements, system designers design algorithms (sequences of arithmetic, trigonometric, logic, control, memory access, indexing operations, and the like) to encode, transmit, and decode signals. These algorithms are typically specified in software. The set of algorithms which achieve the target performance specification is collectively referred to as the executable specification. This executable specification can then be compiled and run on the DSP, typically via the use of a compiler. Despite the increasing computational power and speed of general purpose DSPs and decreasing memory cost and size, designers have not been able to satisfy cost, power and speed requirements simply by programming a general purpose DSP with the executable specification for a standard-specific application.

Additional dedicated high-speed processing is required, a need which has traditionally been met using an application-specific processor. As used herein, an application-specific processor is a processor that excels in the efficient execution (power, area, flexibility) of a set of algorithms tailored to the application. An application-specific processor, however, fares extremely poorly for algorithms outside the intended application space. In other words, the improved speed and power efficiency of application-specific-processors comes at the cost of function flexibility.

Demand is now growing for wireless communications devices that support multiple applications and varying grades of services over multiple standards. In particular, demand is growing for cellular handsets, which are one type of wireless communications device, to support multiple applications and services over multiple standards. Today's solution to this problem is to essentially connect multiple application-specific processors together to obtain multi-standard operation, thereby adding cost in terms of design resources, design time, and silicon area.

Cellular handsets and basestations, including PCS (Personal Communications Services) and 3-G (Third Generation) devices, need to acquire certain cell specific information and characteristics before negotiating a service with a base station. For this purpose, each base station transmits certain cell specific information necessary for a user to acquire services such as paging or cellular telephony from the base station. For example, in CDMA based systems, the cell specific information is contained in pilot and/or synchronization channels. The pilot and/or synchronization channels are spread and scrambled with cell specific pseudo-random noise (PN) or gold code sequences. At the receiver, the scrambled sequence is converted back to the original data sequence.

Multiple users are typically served at a single base station. In CDMA systems, each user is assigned an orthogonal code from a set of orthogonal codes and data that is transmitted from the base station to the user is spread according to the assigned orthogonal code. Even though users operate on the same frequency at the same time, the use of orthogonal codes allow multiple users to be distinguished from one another.

Some data processing systems employ a generic time-sliced architecture to perform data processing functions. Typically, a user builds an application on top of a generic time-sliced architecture based on fixed constraints inherent in the generic time-sliced architecture. For example, data processing engines are designed to optimize the performance on the silicon process for a generic set of operations. When using a generic time-sliced architecture, a user designing an application has the responsibility of real time scheduling (e.g., reading and writing to and from memory) on the generic time sliced architecture. This responsibility is particularly burdensome if a high volume of data comes in at a very high speed, such as data arriving in wireless communications. In addition, even if a user is able to write applications that successfully schedule real time processes, the user still has the burden of managing and maintaining real time aspects of the processing at the lowest level (i.e., below radio frame).

In view of the foregoing, it is desirable to provide a specific processor that supports disparate communications and signal processing standards in a cost, area, and power efficient fashion. It is further desirable to provide a method and apparatus that automates time scheduling aspects of data processing by optimizing a specific time-sliced and multi-threaded architecture in a communication system.

SUMMARY OF THE INVENTION

This invention provides processor architectures that enable high throughput chip rate processing. In an exemplary embodiment, parallel processing techniques and control structures are used to provide flexibility in managing buffer and processing requirements of high performance spread spectrum systems. An architecture in accordance with an exemplary embodiment provides optimization of buffer and processing requirements in a highly flexible micro-architectural implementation. Advantages of implementing the micro-architectures in accordance with embodiments of this invention include: (1) maximizing the efficiency of processing by scaling throughput relative to input data rate; (2) increasing flexibility across a wide range of searching/tracking configurations; (3) improving scalability across variable data rates associated with users; (4) providing software control of finger scheduling to accommodate varying requirements; and (5) providing search control flexibility.

In an exemplary embodiment, a time-sliced and multi-threaded architecture is designed by conducting a thorough analysis of a range of applications and building a specific processor to accommodate the range of applications. In one embodiment, the thorough analysis includes extracting real time aspects from each application, determining optimal granularity in the architecture based on the real time aspects of each application, and adjusting the optimal granularity based on acceptable context switching overhead.

DETAILED DESCRIPTION OF THE INVENTION

Figure 1:
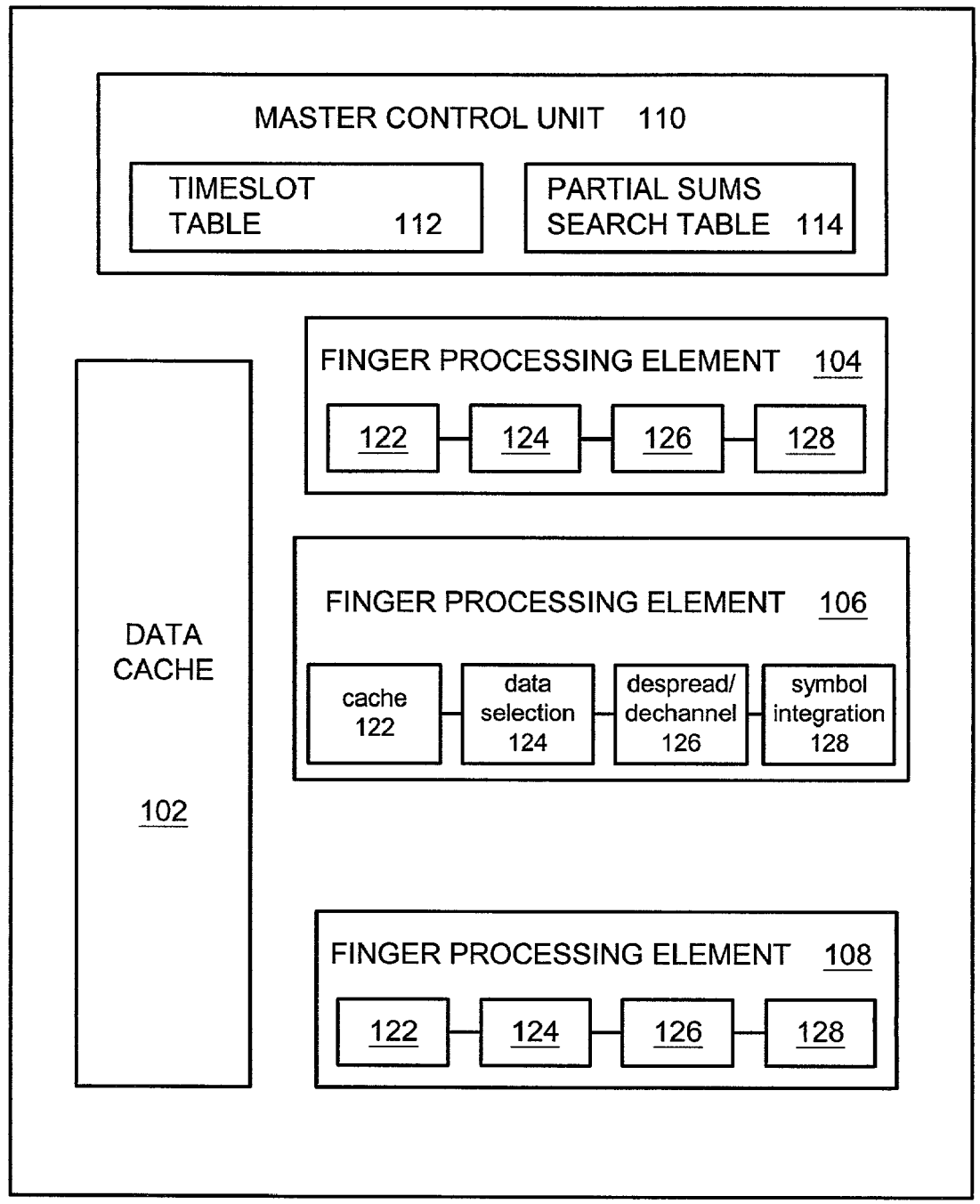
FIG. 1 is a block diagram of an exemplary multi-threaded architecture for spread spectrum chip rate processing in accordance with an embodiment of the invention.

FIG. 1 illustrates a basic multi-threaded micro-architecture 100 in accordance with an exemplary embodiment of the invention. The multi-threaded micro-architecture 100 can be leveraged across numerous multi-user spread spectrum receiver applications. The multi-threaded micro-architecture 100 includes a data cache 102, a first finger processing element 104, a second finger processing element 106, an "nth" (where "n" represents an arbitrary, configurable number) finger processing element 108, and a master control unit 110. The master control unit includes a time slot table 112 and a partial sums search table 114. In an exemplary embodiment, the number of finger processing elements in the architecture 100 is dependent on various design constraints and can vary from architecture to architecture without departing from the essence of this invention. For ease of explanation, three finger processing elements 104, 106, 108 are illustrated in FIG. 1. Each finger processing element includes a secondary cache 122, a data selection module 124, a despread/dechannelize datapath 126, and a symbol integration module 128.

Incoming digital data, which contains code modulated user information, is buffered in the data cache 102. The data cache 102 is shared by all finger processing elements 104-108. Each finger processing element 104-108 contains the necessary datapath for despreading, dechannelization, and symbol integration of the individual user channels. The master control unit 110 allocates time slots, maintains synchronization of the finger processing elements 104-108, and maximizes throughput. For example, the partial sums search table 114 is allocated on a per searcher basis to extend search control flexibility across time slots. In an exemplary embodiment, the master control unit 110 is linked to an external processing element to manage time slot allocation among finger processing elements 104-108.

In an exemplary embodiment, the data cache 102 is a parallel port memory that is configured to enable multi-threaded access at virtually the same time. In one embodiment, a hierarchical caching structure is implemented where the data cache 102 includes a primary cache that is accessible by each finger processing element 104-108 in a round-robin manner. Each finger processing element 104-108 includes a secondary cache that is configured to prefetch data from the primary cache and store such prefetched data. For example, if there are 16 finger processing elements, the first finger processing element 104, during its turn to access the primary cache, prefetches 16 samples, such that it has 16 clock cycles of time before it needs to prefetch again. Similarly, during the next clock cycle, the second finger processing element 106 prefetches 16 samples and so on. This way, the data cache 102 can be built as a multi-ported RAM (e.g., 16-ported) at very low cost. Further details on caching systems are disclosed in the above-referenced, concurrently filed application entitled "Generic Finger Architecture for Spread Spectrum Applications".

The processor architectures in accordance with various embodiments of the present invention use a common processing element (e.g., finger processing elements 104-108) to support varying spreading factors, modulation schemes, and user data rates. Furthermore, the processor architecture enables flexible searching algorithms with variable length search windows, which are made possible in part by a shared search table and a master control. In addition, multiple data stream selection, such as varying antenna configuration, can be used to further reduce silicon costs for manufacturing the finger processing elements. Further details on appropriate processor architecture are disclosed in the above-referenced, concurrently filed application entitled: "Apparatus and Methods for Sample Selection and Reuse of Rake Fingers in Spread Spectrum Systems."

In one embodiment, the multi-threaded micro-architecture 100 is a hardware computation resource that can be applied to a single computation process (e.g., a multipath of a given channel). In another embodiment, the computation resource provided by the multi-threaded micro-architecture 100 can be enhanced by running the multi-threaded micro-architecture 100 at a clock rate higher than that required by a process (e.g., higher than the data rate for a communication protocol). In this manner, resources of individual computation components, such as the multi-threaded microarchitecture 100, can be time-shared across multiple computation processes (e.g., several multipaths and/or multiple channels). Additional information on the design and implementation of configurations into a configurable communication device is provided in a co-pending application bearing Ser. No. 09/492,634, now abandoned, and entitled "Improved Apparatus and Method for Multi-Threaded Signal Processing." This application is commonly assigned and is hereby incorporated for all purposes.

Figure 2:
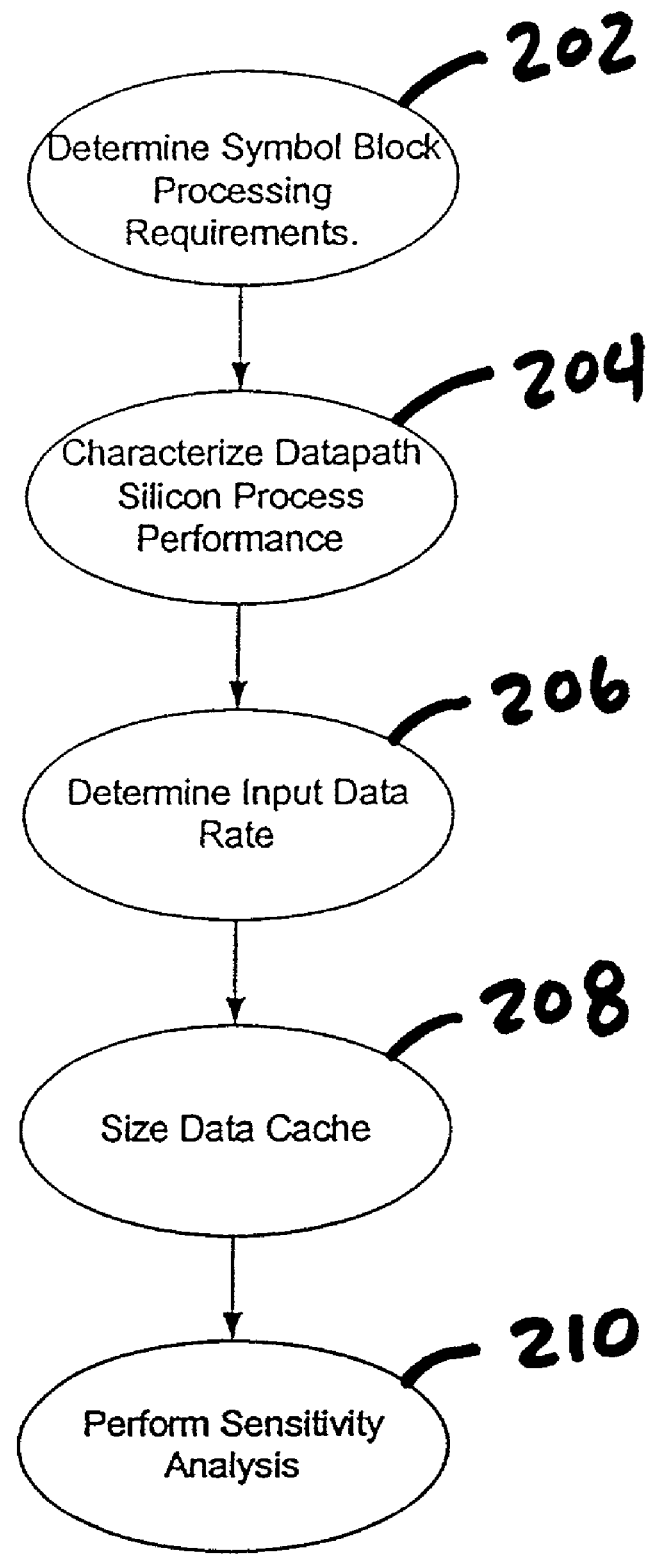
FIG. 2 is a flow chart of an optimal architecture implementation process in accordance with an embodiment of the invention.

FIG. 2 illustrates an exemplary process for designing an optimal time-sliced and multi-threaded architecture. At step 202, symbol processing requirements are determined. In an exemplary embodiment, a microprocessor workstation receives inputs of a range of applications to be supported by the architecture being designed.

The process of determining an optimal component combination that maximizes the efficiency of the multi-threaded chip rate processor involves consideration of various system requirements. In an exemplary embodiment, system requirements include: (1) possible antenna configurations, incoming data rates, and combining requirements; (2) downstream processing requirements that dictate output symbol rate requirements; (3) processor interface requirements that impact the efficient allocation of finger processing elements; (4) variations in the spreading/modulation processes that are applied to the expected data streams; and (5) environmental requirements, such as search time, simultaneous multi-path tracking, and peak/average channel capacity requirements. In an exemplary embodiment, after consideration of system requirements, including the ones listed above, key architecture aspects can be determined. Examples of the key aspects include: data cache memory requirements, number of finger processing elements, performance requirements of the finger processing elements, performance constraints of the finger processing elements, memory bandwidth requirements of the data cache, and time slot size to accommodate convenient downstream processing.

In an exemplary embodiment, fundamental processing units are defined by applying a profiling process. The fundamental processing units are parameterizable processing blocks that may be application specific but can be enabled for a variety of protocols. The profiling process is performed from a system and hardware perspective to optimize time sliced and multi-threaded architecture. Illustrative examples of fundamental processing units are the hardware kernels described in FIG. 2 of co-pending U.S. application Ser. No. 09/772,584 entitled "A Wireless Spread Spectrum Communication Platform Using Dynamically Reconfigurable Logic." Additional information on the profiling process is provided in co-pending U.S. application Ser. No. 09/565,654, now U.S. Pat. No. 6,807,155, and entitled "Method of Profiling Disparate Communications and Signal Processing Standards and Services." These applications are commonly assigned and are hereby incorporated by reference for all purposes.

During profiling, a determination is made of the lowest level of timing granularity needed. In digital signal processing the fundamental time unit is ordinarily the over-sampling rate of the originally transmitted signal which typically is the Nyquest rate. In a typical spread spectrum system, the fundamental unit of time is the chip rate. The fineness of a desired granularity is determined by profiling the types of processing required for each application. Further, in determining granularity, a trade off between fine granularity and high context switching overhead should be considered. In general, the finer the granularity, the better the algorithmic performance. But at the same time, the finer the granularity, the more context switching is required in hardware. In a preferred embodiment, the granularity should be fine enough that the targeted algorithms perform signal processing efficiently while allowing a given process of the targeted algorithms to run in the processor for as long as possible, thus, minimizing context switching overhead.

In an exemplary embodiment, the time-sliced architecture in accordance with the invention is capable of supporting multiple spread spectrum applications that run at different granularities when optimized. For example, a first application may be optimized at 8× chip rate granularity while a second application may be optimized at 1× chip rate granularity.

In another exemplary embodiment, the time-sliced architecture is able to call programming across different protocols in a given application space. In contrast to prior art architectures where the overall concern is regarding hardware resource utilization at a known and fixed performance level, the architecture in accordance with embodiments of this invention is not only application specific (for a set of applications) but also flexibly reconfigurable to support multiple applications. In one embodiment, the present architecture enables speed grading (i.e., sorting and assembly of components into useable devices in accordance with their demonstrated operating speed instead rejection of components for failure to meet a specified operating speed) to control available flexibility. That is, the architecture can be configured into different channel densities depending on the number of logical processors it supports for each application.

At step 204, the target silicon processes needed to achieve the fundamental processing units defined in the previous step (i.e., profiling) are determined. That is, actual physical parts that are capable of delivering each type of processes are determined. For example, most communication operations are linear, so adder and multiplier processing units are frequently required. Thus, during this step, for a given application, the physical location of each necessary adder and/or multiplier (as well as the physical locations of other processing units) on silicon is determined based on data control flow and input/output location.

At step 206, the input and output data rates are determined for each application. In an exemplary embodiment, the input data rate is calculated on a data-samples-persecond-provided-at-input basis. Output are determined by the worst case minimum rate reduction that occurs in the signal processing path.

At step 208, the size of the data cache 102 is determined. The appropriate size for data cache 102 for a spread spectrum application is determined based on balancing a trade-off between the size of the implementation (in terms of actual die size) and the delay spread that is associated with the mobile terminals or handsets. Typically, all mobile terminals in the spread spectrum system are operating in the same frequency range. Thus, the data cache 102 should be able to support two or more mobile terminals simultaneously at any given time. In an exemplary embodiment, a parallel port memory is used as the data cache 102 and a hierarchical caching structure that allows multiple threads to access the same data at the same time is implemented. In the hierarchical caching structure, a secondary cache associated with each processing thread prefetches data from a primary cache for that processing thread.

At step 210, a sensitivity analysis is performed. That is, varied combinations of time slot sizes and processing threads are checked for an optimized combination. For example, the optimal trade-off between context switching overhead and the size of the processing granularity is determined. In an exemplary embodiment, varying time slot sizes, finger processing element numbers, and independent data cache read ports are tested. The optimal number and size are determined in accordance with optimizing the complexity of silicon, including size, and channel capacity requirements.

Variability in time scheduling is determined based on basic time units. In other words, once basic time units have been determined, then variability in scheduling (e.g., timing of the occurrence of certain processes, number of each process per algorithm, etc.) for each algorithm is determined. For example, a given logic algorithm may require use of multiple processing threads. Thus, an optimal trade-off between the number of logic algorithms running on the system and the amount of time needed to run each algorithm should be determined in view of the overall goal of maximizing channel density.

In an exemplary embodiment, real time scaling can be achieved. For example, during off-peak hours, some or all logical threads may be disabled to conserve power consumption.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

The invention claimed is:

1. A time-sliced processor for use in a communication system comprising:
   a master control unit including a time slot table and a partial sum table for any time slot granularity;
   a data cache configured to receive input data and to cache intermediate data at chip or sub-chip resolution; and
   a plurality of signal processing elements, each element comprising:
      a cache configured to receive data from the data cache and to cache intermediate data at chip or sub-chip resolution,
      a data selector connected to an output of the cache,
      a symbol computing engine connected to an output of the data selector, and
      a symbol integrator connected to an output of the symbol computing engine
   wherein the master control unit is configured to allocate the partial sum table on a per signal processing element basis to extend signal processing control flexibility across time slots, and
   wherein the communication system is a spread-spectrum communication system.

2. The time-sliced processor of claim 1, wherein the time-sliced processor is independent of a communication protocol.

3. The time-sliced processor of claim 1, wherein the time-sliced processor supports multiple spread spectrum applications that run at different granularities when optimized.

4. The time-sliced processor of claim 1, wherein the signal processing elements are finger processing elements.

5. The time-sliced processor of claim 1, wherein the symbol computing engine is a despreader.

6. The time-sliced processor of claim 1, wherein the master control unit is configured to configure and control the data cache and the signal processing elements.

7. The time-sliced processor of claim 1, wherein the master control unit is configured to schedule time-sliced signal processing in the data cache and the signal processing elements.

8. The master control unit of claim 7, wherein master control unit is configured to enable the time-sliced processor to support multiple spread spectrum applications that run at different granularities when optimized.

9. The time-sliced processor of claim 1, wherein the master control unit is configured to allocate time slots, maintain synchronization of the signal processing elements, and maximize throughput.

10. The time-sliced processor of claim 1, wherein the master control unit is linked to an external processing element to manage time slot allocation among the signal processing elements.

11. The time-sliced processor of claim 1, wherein the time-sliced processor is configured to call programming across different protocols in a given application space.

12. The time-sliced processor of claim 1, wherein the time-sliced processor is configured to perform speed grading of components.

13. The time-sliced processor of claim 1, wherein the partial sum table is configured to complete a signal processing function across multiple time slots.

14. The time-sliced processor of claim 1, wherein the data cache is configured to cache intermediate data for completing a signal processing function across multiple time slots.

15. The time-sliced processor of claim 1, wherein the time slot granularity is at chip boundary.

16. The time-sliced processor of claim 1, wherein the time slot granularity is at sub-chip boundary.

17. A master control unit in a time-sliced processor of a communication system having a data cache, which receives input data and caches intermediate data, and a plurality of signal processing elements, the master control unit comprising:
   a time slot table; and
   a partial sum table; and
   a plurality of signal processing elements, each element comprising:
      a cache configured to receive data from the data cache and to cache intermediate data at chip or sub-chip resolution,
      a data selector connected to an output of the cache,
      a symbol computing engine connected to an output of the data selector, and
   a symbol integrator connected to an output of the symbol computing engine, wherein the master control unit is configured to configure and control the data cache and the signal processing elements for any time slot granularity, and to control the data cache to cache at chip or sub-chip resolution, and to schedule time-sliced signal processing in the data cache and the signal processing elements.

18. The master control unit of claim 17, wherein the master control unit is configured to allocate time slots, maintain synchronization of the signal processing elements, and maximize throughput.

19. The master control unit of claim 17, wherein the master control unit is configured to allocate the partial sum table on a per searcher basis to extend search control flexibility across time slots.

20. The master control unit of claim 17, wherein the master control unit is linked to an external processing element to manage time slot allocation among the signal processing elements.

21. The master control unit of claim 17, wherein the communication system is a spread-spectrum communication system.

22. The master control unit of claim 17, wherein the master control unit is configured to enable the time-sliced processor to call programming across different protocols in a given application space.

23. The master control unit of claim 17, wherein the master control unit is configured to enable the time-sliced processor to perform speed grading of components.

24. The master control unit of claim 17, wherein the partial sum table is configured to complete a signal processing function across multiple time slots.

25. The master control unit of claim 17, wherein the master control unit is configured to allocate the partial sum table on a per signal processing element basis to extend signal processing control flexibility across time slots.

26. The master control unit of claim 17, wherein the time slot granularity is at chip boundary.

27. The master control unit of claim 17, wherein the time slot granularity is at sub-chip boundary.

28. A time-sliced processor for use in a communication system comprising:

a data cache for receiving input data and for caching intermediate data at chip or sub-chip resolution;

a plurality of signal processing means, each signal processing means comprising:

a cache for receiving data from the data cache and for caching intermediate data at chip or sub-chip resolution, a data selecting means connected to an output of the cache, a symbol computing means connected to an output of the data selecting means, and a symbol integration means connected to an output of the symbol computing means; and a master control means, including a time slot table and a partial sum table, for configuring and controlling the data cache and the signal processing means for any time slot granularity, wherein the partial sum table is configured to complete a signal processing function across multiple time slots.

29. The time-sliced processor of claim 28, wherein the time slot granularity is at chip boundary.

30. The time-sliced processor of claim 28, wherein the time slot granularity is at sub-chip boundary.

\* \* \* \* \*